Figure 2B:
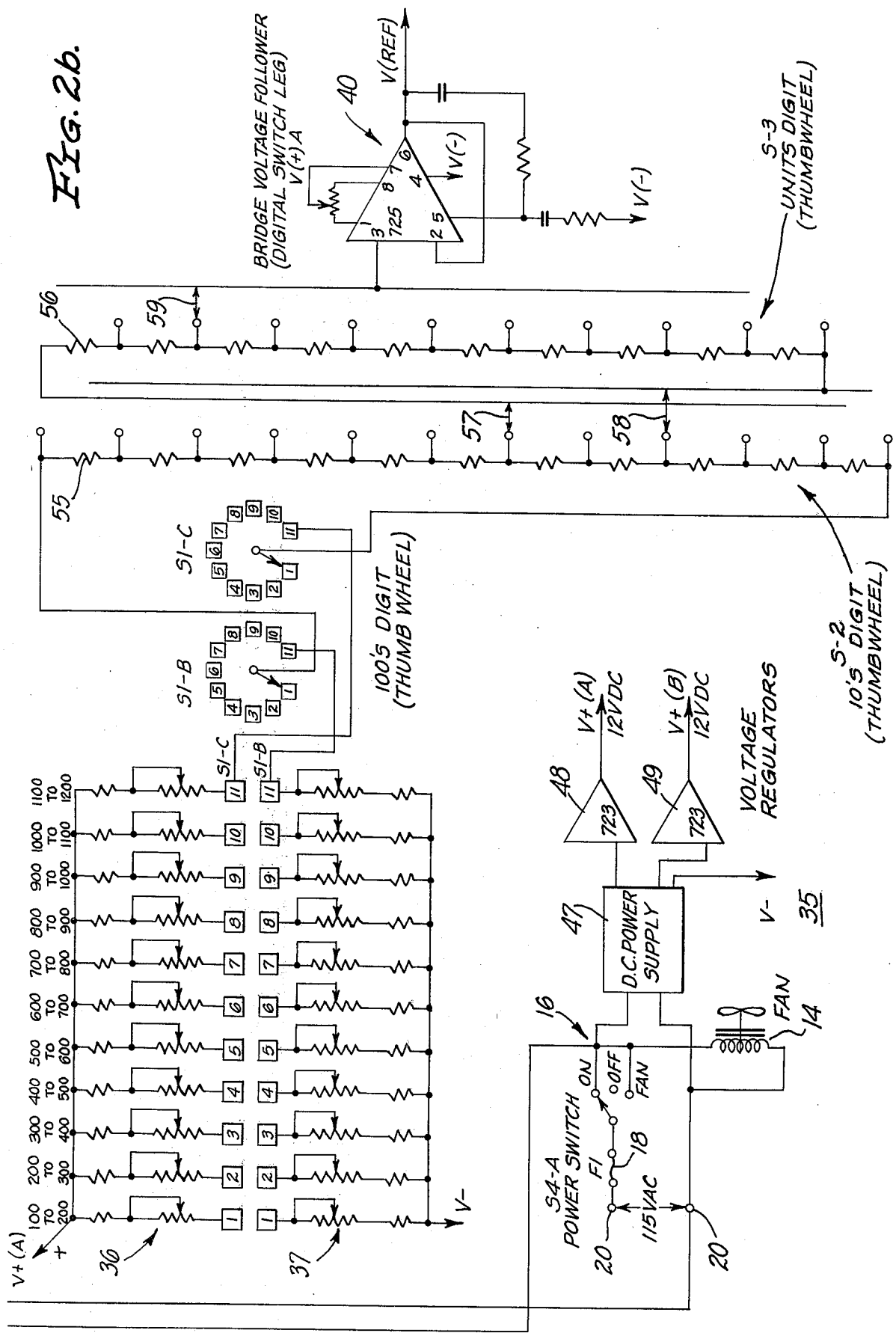

United States Patent [19]
Waldron

[11] 3,939,687
[45] Feb. 24, 1976

[54] TEMPERATURE CALIBRATION SYSTEM

[75] Inventor: Bradley C. Waldron, Canoga Park, Calif.

[73] Assignee: King Nutronics Corporation, Woodland Hills, Calif.

[22] Filed: July 15, 1974

[21] Appl. No.: 488,586

[52] U.S. Cl. .............. 73/1 F; 73/362 AR; 307/117; 323/19; 323/24
[51] Int. Cl.² ................. G01K 15/00; G05F 11/16
[58] Field of Search ....... 73/1 F, 362 AR; 236/78 R, 236/78 D; 307/117; 323/19, 24

[56] References Cited
UNITED STATES PATENTS

| | | | |
|---|---|---|---|
| 3,240,428 | 3/1966 | Umrath | 236/78 D |
| 3,334,814 | 8/1967 | Bray et al. | 236/78 R |
| 3,584,291 | 6/1971 | Budniak et al. | 323/19 X |
| 3,633,094 | 1/1972 | Clements | 323/19 X |
| 3,699,800 | 10/1972 | Waldron | 73/1 F |
| 3,738,174 | 6/1973 | Waldron | 73/362 AR |

OTHER PUBLICATIONS (S0099-0018) Hambley, N. "A Solid State Process Controller." In *LABP* 18-79 *Apparatus and Devices*, Vol. 18, No. 8. pp. 847–850.

Brookmire, J. L. Zero "Voltage Switching for Proportional Temperature Control," In *EEE Circuit Design Engineering*, Vol. 15, No. 4, pp. 97–99, Apr. 1967. TK-7800-E52.

*Primary Examiner*—Richard C. Queisser
*Assistant Examiner*—Frederick Shoon
*Attorney, Agent, or Firm*—Harris, Kern, Wallen & Tinsley

[57] ABSTRACT

A temperature calibration system including a well for receiving a temperature sensor such as a thermometer or thermocouple, and a heater for heating the well to a desired and adjustable temperature. A single well instrument providing a temperature range of 100° to 1199 ° F in one degree steps. A control circuit for controlling well temperature to a few tenths of a degree and including means for manually setting the desired temperature, a bridge incorporating the temperature sensor and the temperature setting resistances, amplifiers for switching power to the well heater, and a null meter for indicating when the instrument is operating at the desired temperature.

6 Claims, 3 Drawing Figures

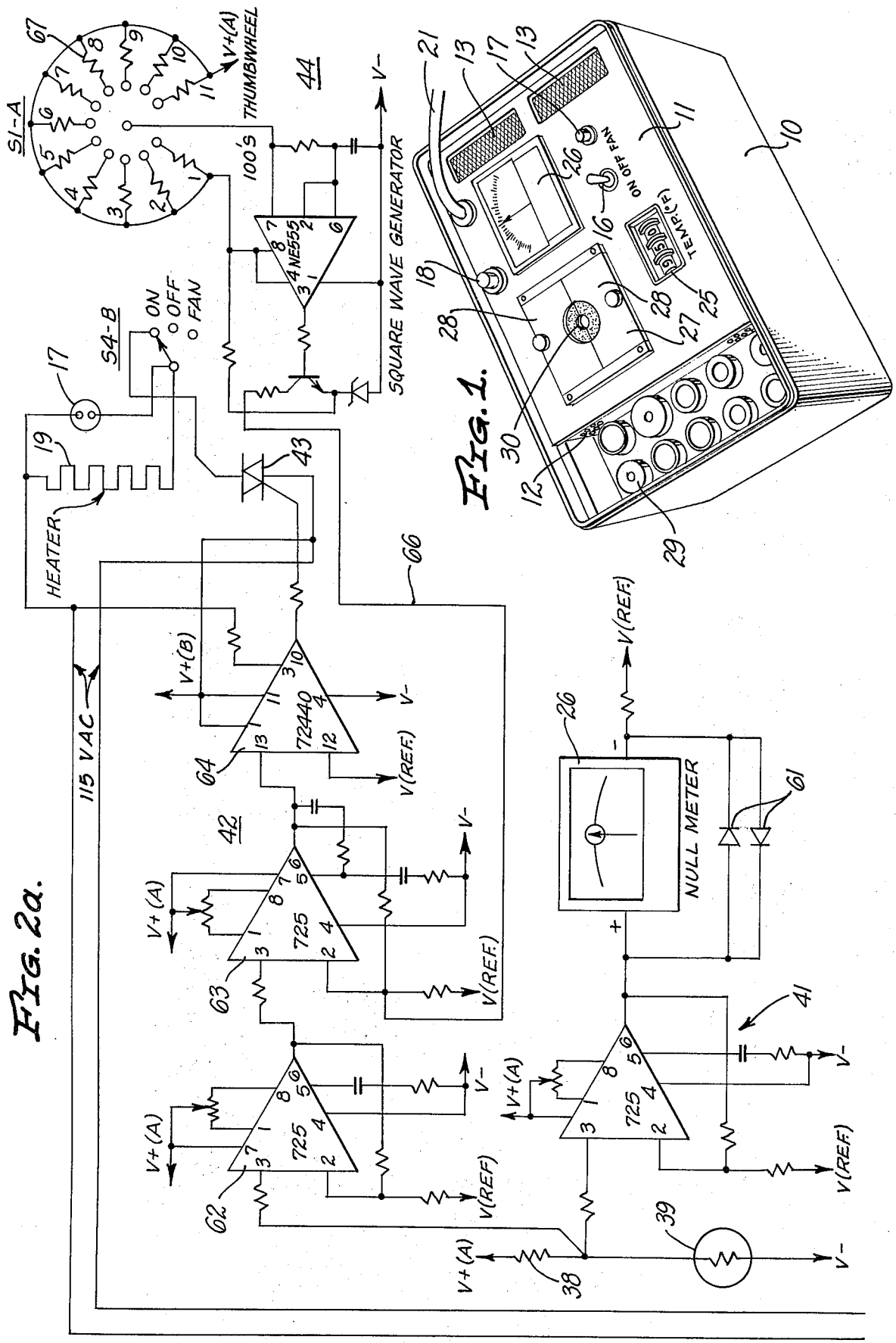

TEMPERATURE CALIBRATION SYSTEM

This invention relates to dry well temperature test systems and to systems particularly designed for on site testing and calibration of temperature sensitive devices such as thermocouples, thermoswitches, thermistors, temperature control systems, and temperature indicators. The system of the invention is particularly well suited for use with remote indicating controls in instrumentation systems. Two prior art systems are shown in the U.S. Pat. Nos. 3,699,800 and 3,738,174.

The prior art devices and the device of the present invention include an electrically heated, dry temperature well for receiving the probe or other temperature sensing device which is to be tested or calibrated. The devices also include some means for setting the desired temperature, a control circuit for controlling the input to the well to obtain the desired temperature, and some means for indicating that the desired temperature has been obtained. The present invention is directed to an improved system having a substantially wider temperature range than the prior art devices. The device of U.S. Pat. No. 3,699,800 utilized three wells, each operating over a limited temperature range, to provide an instrument suitable for industrial use. This instrument incorporated a ramp type proportional control circuit for reducing the hunting of the actual temperature about the desired temperature. This instrument worked satisfactorily for one set of conditions of ambient temperature and line voltage, but variations in ambient temperature and/or supply voltage introduced errors in the system. The device of U.S. Pat. No. 3,738,174 was an improvement on the earlier device and had a very fast thermal response so that temperature hunting was not a problem, with the heat source having an on-off mode of operation. However, the useable range of the instrument was limited and the commercial embodiment had an operating range of 100° to 600°F.

The instrument of the present invention is designed to operate over a considerable wider range, and one commercial embodiment provides for testing and calibration over the range of 100° to 1,200°F (actually a top limit of 1,199°F). The substantial increase in the upper temperature limit introduced a number of problems in the instrument. For example, the well has to be made of a metal with better high temperature characteristics, such as brass or bronze or aluminized ignot iron rather than of aluminum, the temperature sensing device has to be a platinum unit rather than a thermistor, and the heater has to be a calrod type rather than a fine resistance wire type in order to withstand the higher operating temperatures. This has resulted in a unit with a much higher thermal mass with slower heating and slower cooling, introducing temperature hunting problems.

Accordingly, it is an object of the present invention to provide a new and improved control circuit for a temperature calibration instrument which control circuit can operate over a wide temperature range and can substantially eliminate temperature hunting at the null or desired temperature condition. This is achieved by utilizing a bridge circuit for temperature setting and temperature sensing, with amplifiers for the bridge outputs to provide control voltages for switching power on and off to an electrical heater. The bridge outputs are also used to actuate a null meter giving a visual indication of when the system is at the desired temperature. The desired temperature is manually set by a series of digital switches or thumb wheels operating selector switches and voltage dividers to achieve the desired one degree steps in temperature setting.

In the preferred embodiment, power is on continuously when the sensed temperature is more than a predetermined amount below the desired temperature, with power being off when the sensed temperature is greater than the desired temperature, and with the power being on intermittently when the sensed temperature is less than a predetermined amount less than the desired temperature, with the on-off cycle being controlled by a pulse generator and with the off time being variable as a function of the desired temperature so that the maximum heat input at lower desired temperatures is lower than than the maximum heat input at higher desired temperatures providing a satisfactory control over the wide range of temperatures at which the instrument can be used. It also eliminates the need for multiple heaters. In the preferred embodiment illustrated, temperature hunting is substantially eliminated, being less than ± 0.1°F at 1,199°F and less than ± 0.2°F at any temperature.

Other objects, advantages, features and results will more fully appear in the course of the following description. The drawings merely show and the description merely describes a preferred embodiment of the present invention which is given by way of illustration or example.

In the drawings:

FIG. 1 is a perspective view of a portable dry well temperature test system incorporating the presently preferred embodiment of the invention; and FIGS. 2a and 2b are an electrical schematic of the instrument of FIG. 1.

The instrument shown in FIG. 1 includes a housing 10 with the cover removed. A panel 11 is carried within the housing and supports the components of the system within the housing. A perforated plate 12 and screens 13 at each side of the panel 11 provide for air flow through the housing, preferably produced by a motor driven fan 14 (FIG. 2b). A switch 16, an indicator light 17, and a replaceable fuse 18 are mounted in the panel, with the lamp 17 being energized when a resistance heater 19 is energized. Electrical power, typically from a 115 volt AC source is provided for terminals 20 via cable 21.

A set of three thumb wheel switches with digital position indication 25 is mounted in the panel for setting the desired temperature. These switches are identified on the schematic of FIGS. 2a and 2b as S1, S2 and S3 with switch S1 having three banks A, B and C. A null indicating meter 26 and a temperature well 27 are also mounted in the panel 11. The temperature well may be constructed in the manner shown in the aforementioned U.S. Pat. No. 3,738,174, and reference may be made thereto for detailed information on the well. Typically the well may compromise a metal sleeve with the electric resistance heater 19 wound thereon and positioned within a thermally insulated case. Hinged covers 28 may be opened for insertion and removal of a heat sink 29, with opening 30 in the covers providing for insertion and removal of the temperature probe or other item which is to be tested or calibrated. The heat sink 29 is a metal tube which is a sliding fit in the sleeve of the well, and which has a contral opening for receiving the temperature probe. The central opening or bore of the heat sink may be tailored to each particular type of temperature probe to be calibrated, and a plurality of heat sinks normally is provided with each instrument, as shown at the left of FIG. 1.

The electrical circuit includes a power section 35, a bridge with legs 36, 37, 38 and 39, a reference amplifier 40, a meter amplifier 41, an error signal amplifier section 42, a power switch Triac 43, and a pulse generator 44. The power section 35 includes the switch 16 having on, off and fan positions Switch section S4-A provides AC power to the fan 14, the heater 19 and a DC supply 47 when in the on and fan positions, with switch section S4-B providing a closed circuit for power between the Triac 43 and the heater 19 only when in the on position. The DC supply 47 may be a conventional circuit, providing a 12 volt output to voltage regulators 48, 49 which may be 723 integrated circuits.

Leg 39 of the bridge is a temperature sensing resistance built into the well 27 and preferable is a platinum resistance thermometer with its resistance increasing as its temperature increases.

The switch 25 provides for setting the desired temperature value between 100° and 1,199°F. The switch for the 100's digit S1 has 12 positions 0 through 11, with the zero position disconnecting the bridge. The leg 36 includes 11 sets of resistors, with each set having a fixed resistor and an adjustable resistor for calibration purposes. The leg 37 is similar, though the resistance values may be different.

Position 11 of S1-B is connected to position 11 of leg 37 and the other positions of S1-B are similarly connected to the corresponding positions of leg 37, the wire connections being omitted from the drawing for purposes of clarity. Leg 36 and switch S1-C are similarly connected. The 10's and units digit thumbwheels S-2 and S-3 of switch 25 provide a two stage Kelvin-Varley voltage divider. The first stage comprises eleven resistors 55 connected in series between the legs 36, and 37. The second stage comprises ten resistors 56 connected in series across moving contacts 57, 58 of switch S-2. The single moving contact 59 of switch S-3 serves as one corner of the bridge and provides the input signal to reference amplifier 40. Amplifier 40 is operated as a voltage follower and may be a 725 integrated circuit. The output indicated as V(ref) is connected at several points in the circuit as indicated.

The switch 25 permits direct digit dialing of any desired test temperature in the operating range of the instrument. The hundreds digit selects a discrete set of resistors for legs 36, 37, and the tens and units digits serve as a voltage divider to adjust the bridge to a specific temperature within the hundred degrees range obtained with the hundreds digit.

The error signal produced at the bridge corner at the junction of the resistors 38, 39 is provided as an input to the meter amplifier 41 and to the error signal amplifier section 42. The positive voltage V+(A) and the negative voltage V− provide the other two corners of the bridge. The meter amplifier 41 typically is a voltage amplifier with a gain of 5 and may be a 725 integrated circuit. The outputs of the amplifiers 40 and 41 are connected across the null meter 26, the meter may be protected from over voltage by diodes 61. When the error voltage signal is zero, the null meter 26 indicates zero and the temperature well is operating at the temperature indicated on the switch 25. The meter 26 is not designed as a temperature indicating meter, but in the embodiment illustrated, does indicate deviation of the actual temperature from the set temperature in degrees fahrenheit when operating at approximately 650° Fahrenheit. When operating at about 100° Fahrenheit, each meter space indicates about one half degree, and when operating at about 1,100° Fahrenheit, each meter space indicates about 2°.

In the embodiment illustrated, the amplifier section 42 has three stages, comprising amplifier 62 with a gain of 5, amplifier 63 with a gain of 20, and threshold detector and zero crossing trigger 64. These may be 725, 725 and 72440 integrated circuits, respectively. The pulse generator 44 may be a square wave generator utilizing an NE 555 integrated circuit providing a square wave pulse train on output line 66. The pulse rate is controlled by switch section S1-A which is operated in synchronism with sections S1-B and S1-C for connecting one of the resistors 67 into the pulse generator circuit. The pulse rate varies with the setting of the hundreds digit and at 100 degrees is about 20 pulses per minute and at 1,100 degrees is about 200 pulses per minute. Ordinarily the pulse width would be substantially constant and typically about 10 cycles of a 60 hertz source.

The output of the amplifier 63 is a DC voltage equivalent to approximately 100 times the bridge error voltage modulated by the superimposed square wave on line 66. The output of amplifier 63 is connected as an input to the threshold detector 64 which compares the reference signal from amplifier 40 with the error signal. If the error signal represents a sensed temperature more than a predetermined amount (typically 10° Fahrenheit) below the desired or set temperature, the negative error signal causes the threshold detector to turn the zero crossing switch full on. The zero crossing switch in turn furnishes a continuous pulse train to trigger the Triac 43 into conduction and provide AC power to the heater 19. When this error signal indicates a sensed temperature less than the predetermined amount less than the set temperature (typically within the range of 0° to 10°), the timing pulse from the square wave generator produces a reduction in power input to the heater from full on to a duty cycle controlled by the generator output. The zero crossing switch then turns on the Triac for timed power bursts as permitted by the pulses from the square wave generator. The pulse rate as controlled by switch S1-A is selected to provide the input to the well sufficient to generate a maximum temperature called for by the hundreds digit thumbwheel plus 10° to 20°, under worst operating conditions. This arrangement avoids turning the heater on more than is necessary, so that when operating at lower set temperatures, excess power and therefore excess heat is not introduced, which excess would materially increase the difficulties in obtaining the desired temperature without overshoot and hunting about the set point. That is to say, when operating in the 100° range, the Triac will be turned on only about 20 times per minute when the sensed temperature is in the order of 10° below the set temperature. Similarly when operating in the 1,100° range, the Triac will be turned on about 200 times per minute when the sensed temperature is about 10° below the set temperature.

When the sensed temperature at the well exceeds the set point temperature, a positive error signal is produced which turns the threshold detector completely off. The Triac will not fire, the heater gets no power, and the well cools until the threshold of the set temperature is crossed in a negative direction. At any stabilized set point, the heater is limited in the power available by the timer or square wave generator, but the power available is not proportional to the error signal. The common mode error normally found in proportional control circuits do not exist in the circuit of the present instrument.

In operation, the switch 25 is set to the desired temperature and the switch 16 is turned to the on position. Ten to thirty minutes may be required for the instrument to stabilize at the set temperature, which condition is indicated by the null or zero position of the meter 26. After the instrument has once stabilized, it will maintain the set temperature at less than ±0.2°F at any temperature and at less than ±0.1°F at the top temperature 1,199°F. There may be an overshoot during the initial warm up when the instrument first reaches the set temperature. This may be reduced or eliminated by initially setting the temperature below the desired temperature and then, when the instrument is approaching the set temperature (as indicated by flashing of the lamp 17) gradually increasing the set temperature to the desired temperature.

Operation of the instrument of the present invention at 1,200°F raises problems not encountered in prior art devices. The aluminum heat sink utilized in lower temperature devices could not be used because of softening problems, and brass heat sinks are utilized. Also, the fine wire electrical resistance heater of the lower temperature instrument had to be abandoned in favor of the calrod type heater capable of operating at the higher temperatures. The more sensitive temperature sensing thermistor could not be utilized and a platinum temperature sensor is substituted. All of these changes materially increase the thermal mass of the well causing slower heating and slower cooling with resulting increase in the hunting problem. However, the new and improved control circuitry as described above and claimed herein has enabled production of a temperature calibration device operable over the large temperature range with substantially no hunting about the set point.

I claim:

1. In an on-off zero crossing non-proportional control circuit for a system for providing an accurate temperature for calibration of a temperature probe, the system including a well with a heater, a heat sink having an opening for receiving a temperature probe, and a temperature sensing resistor, the combination of:
   a bridge circuit with four legs and four corners, and having a temperature setting resistance in at least one leg and having said temperature sensing resistor in another leg, said temperature setting resistance being manually variable to designate a desired temperature;
   a voltage source connected across first and second opposite corners of said bridge;
   a bridge null indicator having first and second inputs;
   first amplifier means having the third corner of said bridge connected as an input and providing a reference voltage as an output;
   second amplifier means having the fourth corner of said bridge and said reference voltage connected as inputs and providing an output varying as a function of the difference of said inputs, and including an on-off circuit and threshold detector for switching the output between full on and full off;
   switching means for connecting said heater to a power source;
   means for connecting said second amplifier means output to said switching means in controlling relation;
   means for connecting said reference voltage and said fourth corner to said indicator inputs with said indicator indicating a null when the well temperature is substantially at the desired temperature;
   a pulse generator providing a pulse train output;
   means for setting the pulse rate of said generator as a function of said desired temperature with a higher rate for a higher temperature; and
   means for connecting said generator pulse train output to said second amplifier means for controlling said switching means and limiting the full on output when the well temperature is less than a predetermined amount less than the desired temperature so that said heater is energized during only a portion of each cycle of the pulse generator output.

2. A control circuit as defined in claim 1 wherein said switching means includes a triac connected in series with said heater and controlled by the output of said second amplifier means.

3. A control circuit as defined in claim 1 wherein said bridge circuit includes a second temperature setting resistance in a third leg;
   each of said temperature setting resistances having a plurality of resistors connected in parallel with a selector switch and with said selector switches operated in synchronism.

4. A control circuit as defined in claim 3 wherein said bridge circuit includes:
   a first voltage divider connected between said temperature setting resistances;
   a pair of spaced contacts moveable along said first divider;
   a second voltage divider connected between said pair of contacts; and
   another contact moveable along said second divider and defining a corner of said bridge.

5. In an on-off zero crossing non-proportional control circuit for a system for providing an accurate temperature for calibration of a temperature probe, the system including a well with a heater, a heat sink having an opening for receiving a temperature probe, and a temperature sensing resistor, the combination of:
   a bridge circuit with four legs and four corners, and having a temperature setting resistance in at least one leg and having said temperature sensing resistor in another leg, said temperature setting resistance being manually variable to designate a desired temperature;
   a voltage source connected across first and second opposite corners of said bridge;
   a bridge null indicator having first and second inputs;
   amplifier means having third and fourth corners of said bridge connected as inputs and providing an output varying as a function of the difference of said inputs, and including an on-off circuit and threshold detector for switching the output between full on and full off;
   switching means for connecting said heater to a power source;
   means for connecting said amplifier means output to said switching means in controlling relation;
   means for connecting said third and fourth corners to said indicator inputs with said indicator indicating a null when the well temperature is substantially at the desired temperature;

a pulse generator providing a pulse train output means for setting the pulse rate of said generator as a function of said desired temperature with a higher rate for a higher temperature; and means for connecting said generator pulse train output to said amplifier means for controlling said switching means and limiting the full on output when the well temperature is less than a predetermined amount less than the desired temperature so that said heater is energized during only a portion of each cycle of the pulse generator output with said heater continuously energized when the well temperature is more than said predetermined amount less than the desired temperature.

6. In a control circuit for a system for providing an accurate temperature for calibration of a temperature probe, the system including a well with a heater, a heat sink having an opening for receiving a temperature probe, and a temperature sensing resistor, the combination of:

a bridge circuit with four legs and four corners, and having a temperature setting resistance in at least one leg and having said temperature sensing resistor in another leg, said temperature setting resistance being manually variable to designate a desired temperature;

a voltage source connected across first and second opposite corners of said bridge;

a bridge null indicator having first and second inputs;

first amplifier means having the third corner of said bridge connected as an input and providing a reference voltage as an output;

second amplifier means having the fourth corner of said bridge and said reference voltage connected as inputs and providing an output varying as a function of the difference of said inputs;

switching means for connecting said heater to a power source;

means for connecting said second amplifier means output to said switching means in controlling relation; and means for connecting said reference voltage and said fourth corner to said indicator inputs with said indicator indicating a null when the well temperature is substantially at the desired temperature;

said bridge circuit including:

a second temperature setting resistance in a third leg, each of said temperature setting resistances having a plurality of resistors connected in parallel with a selector switch and with said selector switches operated in synchronism;

a first voltage divider connected between said temperature setting resistances;

a pair of spaced contacts moveable along said first divider;

a second voltage divider connected between said pair of contacts; and another contact moveable along said second divider and defining a corner of said bridge.

* * * * *